June 6, 1944.  A. H. SCHUTTE  2,350,934

LIQUID-SOLID SEPARATION

Filed Feb. 28, 1941

INVENTOR
August Henry Schutte
BY Nathaniel Ely
ATTORNEY

Patented June 6, 1944

2,350,934

UNITED STATES PATENT OFFICE 2,350,934

LIQUID-SOLID SEPARATION

August Henry Schutte, Tuckahoe, N. Y.

Application February 28, 1941, Serial No. 381,054

5 Claims. (Cl. 210—63)

This invention relates to a method of separating mixtures of materials of different melting points by liquid-solid separating means and is a modification of and improvement on the disclosure in my prior patent, No. 2,168,306, patented August 1, 1939.

It is a principal object of my invention to provide an improved method for treating the solid matter or cake which is formed after the removal of the liquids in a liquid-solid separation, by which the solid matter is substantially uniformly heated with a radiant energy to obtain a uniform temperature increase across the entire depth whereby the occluded liquid is released.

A more specific object of my invention is to provide an infra-red ray heating source for applying small amounts of heat to a filter cake whereby added amounts of filtrate are uniformly and simultaneously released throughout the cake depth without a substantial melting of the filter cake.

A still further object of my invention is to centrifugally filter an emulsion of waxeous mixtures and a non-solvent liquid to obtain a filter cake of relatively high melting point and thereafter subjecting such filter cake to heating by radiant energy having a relatively short wave length whereby the waxeous crystals are affected to release additional quantities of lower melting point liquids.

Figure 1:
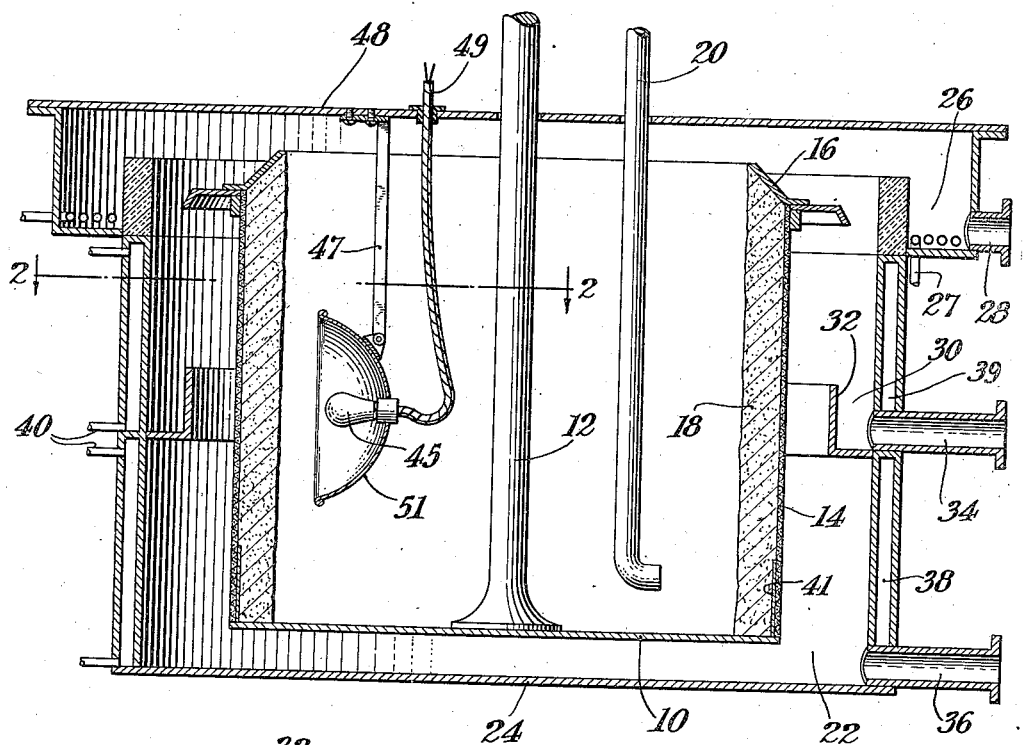
Figure 2:
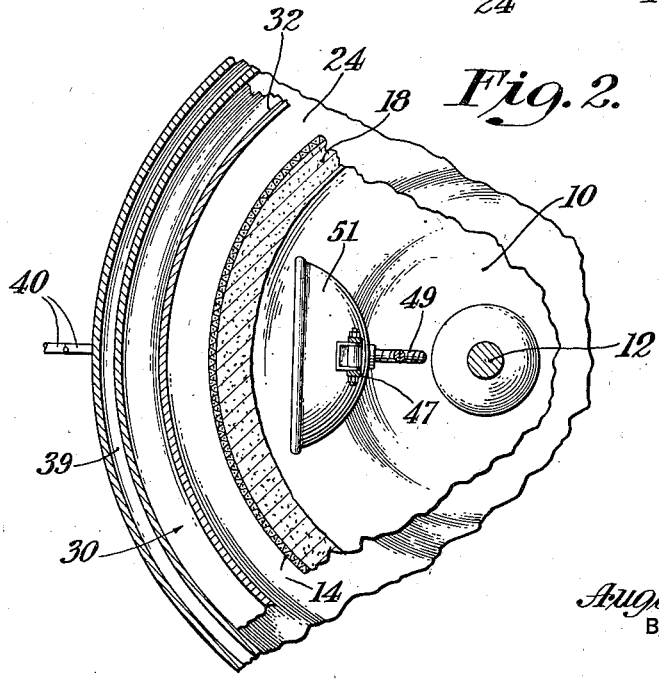

Further objects and advantages of my invention will appear from the following description of a preferred form of embodiment thereof taken in connection with the attached drawing, illustrative thereof, and in which Fig. 1 is a central vertical section through a centrifugal filter;

Fig. 2 is a partial horizontal section taken substantially along the line 2—2 of Fig. 1.

I have heretofore carried out with commercial success a separation of materials of different melting points in accordance with their melting points by forming an emulsion thereof with a non-solvent liquid such as water. The emulsion was chilled to a sufficient extent to precipitate the desired amount of higher melting point material, and the emulsion was then charged to a filter such as a centrifugal filter with the formation of a filter cake on the filter wall by the removal of the filtrate through the filter wall. The filter cake, being a light porous material, was substantially free filtering and continuously discharged due to a resultant of forces thereon, which forces were proportional to the density of the heavy slurry and the relatively light cake.

Ordinarily it is found desirable to wash the formed cake with a warm liquid, which will free additional liquid and low melting point materials in the cake. In such action, the heating of the cake is by a reduction of temperature of the wash liquid. There is, therefore, a decrease in effectiveness of the wash liquid as it penetrates the cake, and either an excessive temperature of wash is required at the exposed cake surface or insufficient heating is accomplished next to the filter wall.

In accordance with my present invention, I have determined that a superior result can be obtained and uniform controlled temperature heating of the cake accomplished by applying radiant energy to the cake in the form of short waves as of the infra-red or high frequency type.

It is well known that the infra-red ray includes that band of radiant energy which is between the visible rays and the electromagnetic wave band. Expressed in Angstrom units, the infra-red ray band is usually denoted as extending from 8000 A. to .03 centimeters. By infra-red rays I particularly mean those rays which are emitted by hot substantially non-incandescent bodies and which are for the most part invisible and are detected by their thermal rather than their light effect. I do not mean to be limited to the specific wave lengths in the infra-red ray band, for the short waves of high frequency bordering the infra-red ray band can be used with some degree of success. On one side, for example, are the rays which are predominantly infra-red rays but which may include shorter waves as from a partially luminous body, while on the other side of the infra-red band are the so-called short waves of radio used in electrical therapy. In each case the wave lengths and frequency are such that they are particularly suitable for transmitting small amounts of heat at substantially uniform temperature and are particularly of advantage in connection with filter cake bodies of several inches in thickness, in which a heating or partial solution or internal disruption of the wax crystals is obtained, which is sufficient to free occluded oil and lower melting point materials without removing the normally higher melting point wax.

The application of heat of this type is of particular advantage during the continuous centrifugal filtration in that the rupture or softening of the wax particles, while under the influence of the high centrifugal force, is such as to facilitate the squeezing out of the oil which may have been retained therein. The heat appears to be applied uniformly throughout the cake body, and accurate control of the temperature is possible, it being noted that the temperature of operation is such that variations of a few degrees Fahrenheit are sufficient under some conditions to liquefy the entire mass of cake, which would be a destruction of the entire treatment.

As more specifically shown in the attached drawing, the apparatus in which I carry out the liquid-solid separation consists primarily of a rotating basket having a base 10 rotated by a suitable drive shaft 12 and having a substantially cylindrical foraminous filter wall 14 which is open at the top and is surmounted by a truncated conical ring 16, which controls the thickness of the cake generally indicated at 18.

The chilled emulsion of materials of different melting points and non-solvent liquid with the higher melting point material in a dispersed solid form is introduced to the machine through the feed pipe 20 and, on rotation of the basket 10, the filtrate will discharge into the filtrate chamber 22 in the housing 24. The filter cake 18 forms on the wall of the basket and continuously discharges over the cone ring 16 into a cake collecting chamber 26, which may be suitably heated as by a steam coil 27 so that the liquefied cake can be withdrawn through the outlet conduit 28.

An intermediate filtrate collecting zone 30 is also formed as by the trough 32, and the intermediate filtrate discharges through the conduit 34. The primary filtrate discharges at the bottom of the machine through the conduit 36.

Due to the difference in temperature requirements for the primary filtrate zone 22 and the intermediate filtrate zone 30, it is desirable to provide the housing 24 with separate chambers 38 and 39, which may be independently heated as by the introduction of heating materials through the conduits 40.

Under normal operation the first cake tends to form at the lower part of the filter wall 14, and, to avoid excessive driving of the cake through the filter wall, I provide an imperforate baffle 41 against the lower part of the filter wall. The filtrate readily runs over the top of such baffle 41, and after a short operation a continuous body of cake is formed from top to bottom of the machine and thereafter the continued feed of slurry causes the uniform travel of the cake across the filter wall to the discharge lip.

This cake contains a small amount of liquid which is apparently occluded within the porous structure of the cake, and I have found that the application of the radiant energy heat from a suitable source is particularly advantageous in releasing further amounts of liquid. The radiant energy source may consist of a unit 45 mounted in a suitable reflector 51 and supported by means of the bracket 47 from the cover 48 on the machine, such source of heat being supplied with electrical energy through the conduit 49. The amount of radiant energy is readily controlled in the usual manner, and the focused rays exert a continuous uniform heating throughout the thickness of the cake during the operation of the centrifuge. The cake, therefore, is simultaneously disrupted by the radiant energy with the result that the occluded oil is freed, and, with the compression of the centrifugal effect during the rotation of the filter, the cake will tend to compact and further squeeze out the oil or lower melting point material. In the zone of the radiant energy and above it the cake will then have a greater density than if it were otherwise free to discharge without washing.

The intermediate melting point filtrate removed through the line 34 may be subsequently treated for additional yields of end products, and its removal will assure a maximum yield of high melting point products as cake.

The radiant energy effect of an infra-red ray source is superior to the normal washing, for there is not the reduction in temperature due to the loss of heat as it passes through the cake characteristic of other washing media. Furthermore, it is possible to obtain a precise temperature control, which is sufficient to break down the porous cake web without liquefying an unnecessary portion of the higher melting point materials forming the cake. The amount of heat required is relatively small.

Although reference is particularly made to the heating of waxeous filter cakes, it will be appreciated that the invention is applicable to the treatment of other filter cakes or solid masses of a porous nature which can be heat treated to free a liquid constituent.

While I have shown and described a preferred form of embodiment of my invention, I am aware that other modifications may be made thereto, and I, therefore, desire a broad interpretation of my invention within the scope and spirit of the description herein and of the claims appended hereinafter.

I claim:

1. The method of separating occluded liquid from an annular hollow cake of porous meltable solid material accumulated in a liquid-solid separating operation, which comprises applying infra-red ray heat energy from an infra-red lamp to the inner face of said hollow porous cake, controlling the application of said energy to the porous cake to heat the cake substantially uniformly throughout its depth and to a degree sufficient to soften the solid material of the cake for freeing the occluded liquid within said material and insufficient to liquefy said material, and expelling the freed liquid from said material by application of a differential pressure to the thus heated porous cake.

2. The method of separating occluded liquid from a porous filter cake of meltable wax accumulated in a liquid-solid separating operation, which comprises applying infra-red ray heat energy generated by an infra-red lamp to said porous wax cake, controlling the application of said infra-red energy to the porous wax cake to heat the cake substantially uniformly throughout its depth and to a degree sufficient to soften only the material of the cake for freeing the occluded liquid within said meltable wax and insufficient to substantially liquefy the said material, and subjecting said porous wax cake to the action of centrifugal force, simultaneously with said infra-red heat energy application, to thereby create a pressure differential upon the porous wax cake for expulsion of the said freed liquid from the cake.

3. The method of continuously separating different melting point materials from an emulsion of such materials with a liquid non-solvent with respect to said materials, which comprises chilling such emulsion to precipitate one of the principal materials as a meltable solid, centrifugally separating the chilled emulsion and thereby forming a porous cake of said solid material, concentrating and radially directing radiant energy from an infra-red lamp upon said porous cake within a zone of the latter during said centrifugal separating operation, controlling the application of said radiant energy to the said porous cake to heat the cake substantially uniformly throughout its radial depth within said zone and to a degree sufficient to soften the solid material of the porous cake for freeing occluded liquid within said material and insufficient to liquefy the solid material of the porous cake, for expulsion of the so-freed liquid from the cake by centrifugal force, and continuously advancing the solid material of the porous cake axially through and out of said heating zone.

4. A centrifugal separator comprising a receptacle for a liquid-solid mixture mounted for rotation to separate the liquid from the solid centrifugally and form a porous cake of the separated solid within the receptacle, said receptacle being closed at one end and open at its opposite end for continuous discharge of the material of said cake axially from the receptacle, means to deliver said mixture continuously into said receptacle at a point adjacent said closed end thereof, electrical means comprising a lamp for generating infra-red rays, and reflector means to concentrate the infra-red rays generated by said lamp and direct said infra-red rays radially outward within said receptacle and upon the porous cake within a zone thereof located between said delivery point of the mixture and the open end of the receptacle, for the purpose set forth.

5. A centrifugal separator comprising a receptacle for a liquid-solid mixture mounted for rotation to separate the liquid from the solid centrifugally and form a porous cake of the separated solid within the receptacle, electrical means comprising a lamp for generating infra-red rays, and reflector means to concentrate the infra-red rays generated by said lamp and direct said rays radially outward within said receptacle and upon the cake, for the purpose set forth.

AUGUST HENRY SCHUTTE.